United States Patent
Durham et al.

(10) Patent No.: US 11,836,094 B2
(45) Date of Patent: Dec. 5, 2023

(54) CRYPTOGRAPHIC DATA OBJECTS PAGE CONVERSION

(71) Applicant: Intel Corporation, Santa Clara, CA (US)

(72) Inventors: David M. Durham, Beaverton, OR (US); Anna Trikalinou, Hillsboro, OR (US); Michael LeMay, Hillsboro, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 17/699,593

(22) Filed: Mar. 21, 2022

(65) Prior Publication Data
US 2022/0206960 A1    Jun. 30, 2022

(51) Int. Cl.
*G06F 12/00* (2006.01)
*G06F 12/14* (2006.01)
*G06F 12/02* (2006.01)
*G06F 12/1009* (2016.01)

(52) U.S. Cl.
CPC ...... *G06F 12/1408* (2013.01); *G06F 12/0238* (2013.01); *G06F 12/1009* (2013.01); *G06F 12/1441* (2013.01)

(58) Field of Classification Search
CPC ............ G06F 12/1408; G06F 12/0238; G06F 12/1009; G06F 12/1441; G06F 12/1491; G06F 12/145; G06F 2212/1004; G06F 2212/1052
See application file for complete search history.

(56) References Cited

U.S. PATENT DOCUMENTS

2020/0125501 A1* 4/2020 Durham .................. G06F 21/78
2020/0159676 A1* 5/2020 Durham ................ H04L 9/0822
2020/0409868 A1* 12/2020 Durham .............. G06F 12/1009

* cited by examiner

*Primary Examiner* — Arvind Talukdar
(74) *Attorney, Agent, or Firm* — Jaffery Watson Mendonsa & Hamilton LLP

(57) ABSTRACT

A method comprises identifying a first page in a computer readable memory communicatively coupled to the apparatus that has been marked as being stored in memory as plaintext even if accessed using cryptographic addresses, the first page in the computer readable memory comprising at least one encrypted data object, and set a page table entry bit for the first page to a first value which indicates that at least one memory allocation in the first page has been marked as being stored in memory as plaintext even if accessed using cryptographic addresses.

21 Claims, 10 Drawing Sheets

Pointer with Bounds.
(e.g., Capability) 110

| Validity Tag 110A | Bounds 110B | Address 110C (e.g., Virtual Address) |

Pointer with Bounds.
(e.g., Capability) 110

| Validity Tag 110A | Perm. 110D | Obj. Type 110E | Version 110F | Bounds 110B | Address 110C (e.g., Virtual Address) |

Tripwire 1010A

| TRIPWIRE PREFIX FROM TW_VALUE 1012A | BPV 1014A | APV 1016A | ALLOCATION 1020 | TRIPWIRE PREFIX FROM TW_VALUE 1012B | BPV 1014B | APV 1016B |
|---|---|---|---|---|---|---|

Tripwire 1010B

TW Directory Entry 1100

| RSVD 1110 | WHOLE-PAGE VERSION AND POWER 1112 | WHOLE-PAGE ALLOC? 1114 | TWs PRESENT IN PAGE? 1116 |
|---|---|---|---|
| 5 Bits | 15 Bits | 1 Bit | 1 Bit |

TW Locator Table 1130

| TWDEs (16 BITS PER PAGE) 1140 | TW BITMAPS (64 BYTES PER PAGE) 1144 |
|---|---|

FIG. 11

CRYPTOGRAPHIC DATA OBJECTS PAGE CONVERSION

BACKGROUND

Subject matter described herein relates generally to the field of computer security and more particularly to cryptographic data objects page conversion.

Cryptographic Capability Computing ($C^3$) defines per-data object encryption using cryptographic pointers. Using a pointer as a tweak-key to unlock individual data objects in a memory space can create compatibility problems e.g., for legacy software, aliasing, and legacy device input/output (I/O). For example, the purpose of a memory allocation (e.g., on malloc or new) through the heap manager may not be known to the allocator. These memory allocations may be used in normal program flows or may be shared for device input/output and/or direct memory access (DMA), or otherwise aliased in a way that breaks the binding between a pointer (i.e., cryptographic capability) and its associated cryptographic data object (encrypted object/allocation.

Accordingly, systems and methods to enable decrypting cryptographic data objects on a page on-demand may find utility, e.g., in improving backward compatibility with legacy systems and devices.

BRIEF DESCRIPTION OF THE DRAWINGS

The detailed description is described with reference to the accompanying figures.

FIG. 2A is a schematic illustration of a pointer in an implementation of cryptographic data objects page conversion in accordance with some examples.

FIG. 2B is a schematic illustration of a pointer in an implementation of cryptographic data objects page conversion in accordance with some examples.

FIG. 6A is a schematic illustration of memory access in cryptographic computing lacking enhanced functionality for decrypting data on-demand in accordance with some examples.

FIG. 6B is a schematic illustration of memory access in cryptographic computing including enhanced functionality for decrypting data on-demand to support aliasing in accordance with some examples

FIG. 10 is a schematic illustration of a data structure which may be used to facilitate cryptographic data objects page conversion in accordance with some examples.

FIG. 11 is a schematic illustration of data structures which may be used to facilitate cryptographic data objects page conversion in accordance with some examples.

DETAILED DESCRIPTION

Figure 1:
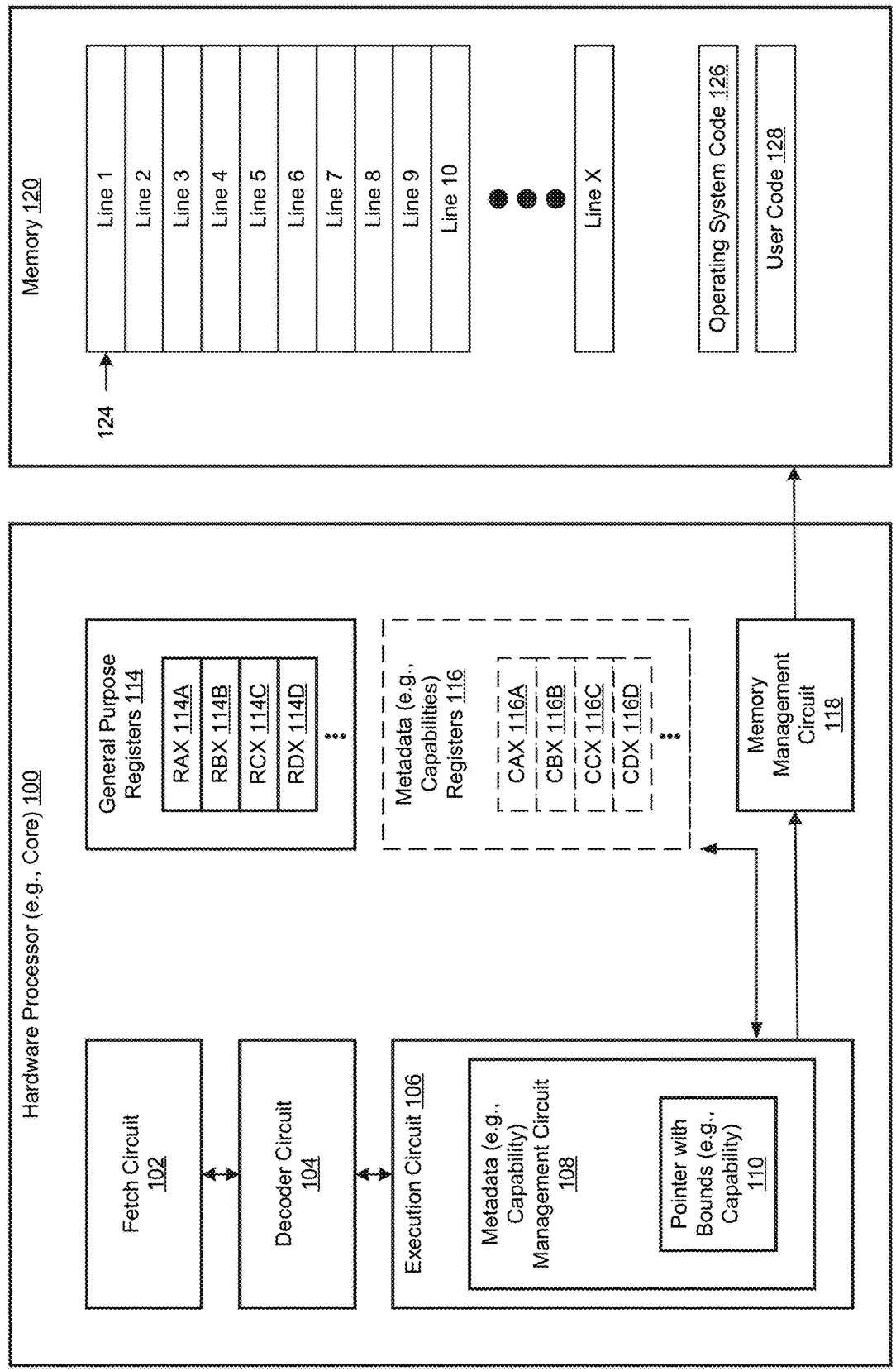
FIG. 1 is a schematic, block diagram illustration of a multiple core hardware processor in an implementation of cryptographic data objects page conversion in accordance with some examples.

Described herein are exemplary systems and methods to implement cryptographic data objects page conversion. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As described briefly above, Cryptographic Capability Computing ($C^3$) defines per-data object encryption using cryptographic pointers. Using a pointer as a tweak-key to unlock individual data objects in a memory space can create compatibility problems e.g., for legacy software, aliasing, and legacy device input/output (I/O). For example, the purpose of a memory allocation (e.g., on malloc or new) through the heap manager may not be known to the allocator. These memory allocations may be used in normal program flows or may be shared for device input/output and/or direct memory access (DMA), or otherwise aliased in a way that breaks the binding between a pointer (i.e., cryptographic capability) and its associated cryptographic data object (encrypted object/allocation).

Techniques described herein enable the conversion of pages containing cryptographic data objects into a plaintext allowing for legacy device input/output operations, antivirus scanning and aliasing. In some examples a page table bit may be used to indicate that the contents of a page have been transformed/decrypted. Alternatives and methods for tracking and managing per-object cryptographic state and metadata are also described. Subject matter described herein allows cryptographic data objects to be used with legacy software and input/output operations by allowing data objects on converted pages to be accessed by legacy input/output techniques and used with legacy software using conventional canonical addressing as well as cryptographic addressing. Further structural and methodological details relating to cryptographic data objects page conversion are described below with reference to FIG. 1 through FIG. 12, below.

FIG. 1 is a schematic, block diagram illustration of components of an apparatus to implement cryptographic data objects page conversion in accordance with some examples. Referring to FIG. 1, hardware processor 100 (e.g., core) including a metadata (e.g., capability) management circuit 108 and coupled to a memory 120 according to examples of the disclosure. Although the metadata (e.g., capability) management circuit 108 is depicted within the execution circuit 106, it should be understood that the metadata (e.g., capability) management circuit can be located elsewhere, for example, in another component of hardware processor 100 (e.g., within fetch circuit 102) or separate from the depicted components of hardware processor 100.

In certain examples, metadata (e.g., capability) management circuit 108 enforces one or more (e.g., many) requirements for accessing (e.g., storing) security metadata or other metadata alongside each allocation (e.g., object) in memory. For example, metadata may include one or more (e.g., any single or combination of): (i) a tag (or version) number (e.g., used to prevent dangling pointers from accessing memory in a use-after free (UAF) attack), (ii) a bitmap that indicates which portions of an object contain pointers that are to be protected from corruption, (iii) a per-object key or key ID that is assigned to uniquely encrypt and/or decrypt each object, (iv) a type identification (ID) that is associated with each object of that specified type, (v) an ownership ID used to enforce (e.g., according to a Rust specification) ownership transfer and borrowing, (vi) a table specifying the category of each pointer and data item associated with each portion of an object that may contain a distinct pointer or data item, (vii) an identifier for code authorized to access the data such as a code hash value, or (viii) an aggregate cryptographic message authentication code (MAC) value, Integrity-Check Value (ICV), or error correction code (ECC) for the data allocation.

Certain examples utilize a memory corruption detection (MCD) value in each pointer and a corresponding (e.g., matching) MCD value saved in the memory for the memory being pointed to, for example, saved as (e.g., tag) metadata (e.g., data that describes other data) for each block of data being pointed to by the pointer. A MCD value may be a sequence of bits, for example, 2, 3, 4, 5, 6, 7, 8. 9, 10, 11, 12, 13, 14, 15, 16 bits, etc. In certain examples, metadata (e.g., capability) management circuit 108 validates pointers produced by instructions of the applications being executed by the processing system or processor that request access to the memory. Certain examples herein (e.g., of settings of metadata (e.g., capability) management circuit 108) utilize one of more of the following attributes for memory corruption detection: MCD enabled (e.g., to turn the MCD feature on or off), MCD position (e.g., to define the bit position(s) of MCD values (metadata) in pointers), MCD protected space, for example, a prefix in the most significant bit positions of the pointer (e.g., to define the linear address range that is to be protected by the architecture), and MCD directory base (e.g., to point to the memory MCD value (e.g., metadata) table (e.g., directory)).

Certain examples use an ownership ID to enforce (e.g., according to a Rust specification) ownership transfer and borrowing, e.g., with the ownership ID being metadata for a pointer. In certain examples, memory 120 is managed through a system of ownership with a set of rules that the compiler checks at compile time, e.g., according to a Rust specification. In certain examples, the rules of ownership include one or more (e.g., all) of: (i) each value has a variable that is called its "owner", (ii) there can only be one owner at a time for a value, and (iii) when the owner goes out of scope, the value is dropped (e.g., freed from memory).

Depicted hardware processor 100 includes a hardware fetch circuit 102 to fetch an instruction (e.g., from memory 120), e.g., an instruction that is to request access to a block (or blocks) of memory 120 through a pointer with bounds 110 (e.g., a capability) to the block (or blocks) of the memory 120. Depicted hardware processor 100 includes a hardware decoder circuit 104 to decode an instruction, e.g., an instruction that is to request access to a block (or blocks) of memory 120 through a pointer with bounds 110 (e.g., a capability) to the block (or blocks) of the memory 120. Depicted hardware execution circuit 106 is to execute the decoded instruction, e.g., an instruction that is to request access to a block (or blocks) of memory 120 through a pointer with bounds 110 (e.g., a capability) to the block (or blocks) of the memory 120.

In certain examples, metadata (e.g., capability) management circuit 108 is to, in response to receiving an instruction that is requested for fetch, decode, and/or execution, check if the instruction is a bounds-checking instruction (e.g., an instruction that is to access memory via a pointer including a bounds field) or a non-bounds instruction (e.g., a bounds-unaware instruction), for example, and (i) if a bounds instruction, is to allow access to memory 120 storing data and/or instructions (e.g., an object) within the indicated bounds (e.g., but not outside of the bounds), and/or (ii) if a non-bounds instruction, is not to allow access to memory 120 storing data and/or instructions (e.g., an object) within any bounded storage (e.g., object storage). In some examples, this latter property is enforced by applying a default bounds check to the accesses by the non-bounds instruction. In some examples, bounded storage is partially or fully accessible by non-bounds instructions. In certain examples, a bounds instruction is a bounds-checking instruction, for example, and is not a BOUND instruction that checks an array index against bounds (e.g., that determines if the first operand (array index) is within the bounds of an array specified by the second operand (bounds operand)).

In certain examples, metadata (e.g., capability) management circuit 108 is to, in response to receiving an instruction that is requested for fetch, decode, and/or execution, check if the instruction is a capability instruction or a non-capability instruction (e.g., a capability-unaware instruction), for example, and (i) if a capability instruction (for example, an instruction authorized to manipulate capabilities, e.g., change the contents of the capabilities themselves), is to allow access to memory 120 storing (1) a capability and/or (2) data and/or instructions (e.g., an object) protected by a capability, and/or (ii) if a non-capability instruction, is not to allow access to memory 120 storing (1) a capability and/or (2) data and/or instructions (e.g., an object) protected by a capability.

In certain examples, metadata (e.g., capability) management circuit 108 is to check if an instruction is a bounds instruction or a non-bounds instruction by checking (i) a field (e.g., opcode) of the instruction (e.g., checking a corresponding bit or bits of the field that indicate if that instruction is a bounds instruction or a non-bounds instruction) and/or (ii) if a particular operand register is a "bounds" type of register (e.g., instead of a general-purpose data register) (e.g., implying that certain register(s) are not to be used to store a bounds field).

In certain examples, metadata (e.g., capability) management circuit 108 is to check if an instruction is a capability instruction or a non-capability instruction by checking (i) a field (e.g., opcode) of the instruction (e.g., checking a corresponding bit or bits of the field that indicate if that instruction is a capability instruction or a non-capability instruction) and/or (ii) if a particular operand register is a "capability" type of register (e.g., instead of a general-purpose data register) (e.g., implying that certain register(s) are not to be used to store a capability or capabilities). In certain examples, metadata (e.g., capability) management circuit 108 is to manage the capabilities, e.g., only the metadata (e.g., capability) management circuit is to set and/or clear validity tags. In certain examples, metadata (e.g., capability) management circuit 108 is to clear the validity tag of a capability in a register in response to that register being written to by a non-capability instruction. In certain examples, capabilities are encrypted so that they are protected from corruption and forgery without requiring a validity tag. In certain examples, capabilities are split across multiple registers.

In certain examples, the source storage location (e.g., virtual address) in memory 120 for data (e.g., an object) within the bounds of the "pointer with bounds" 110 is an operand of an (e.g., supervisor level or user level) instruction (e.g., having a mnemonic of LoadData) that is to load the data (e.g., an object) included within those bounds from the memory 120 into register(s) 112. In certain examples, the source storage location (e.g., virtual address) in memory 120 for instructions within the bounds of the "pointer with bounds" 110 is accessed by the fetch circuit 102 of the hardware processor 100 to fetch the instructions within the code region demarcated by those bounds from the memory 120. In certain examples, the destination storage location (e.g., virtual address) in memory 120 for data and/or instructions (e.g., an object) to-be-protected by the bounds of the "pointer with bounds" 110 is an operand of an (e.g., supervisor level or user level) instruction (e.g., having a mnemonic of StoreData) that is to store the data and/or instructions (e.g., an object) protected by those bounds from the register(s) 112 into memory 120. In certain examples, the instruction is requested for execution by executing OS code 126 (e.g., or some other privileged process authorized to do so) and/or by executing user code 128. In certain examples, an instruction set architecture (ISA) includes one or more instructions for manipulating the bounds field, e.g., to set the lower bound and/or upper bound of an object.

In certain examples, the source storage location (e.g., virtual address) in memory 120 for data and/or instructions (e.g., an object) protected by the metadata and/or bounds of the "pointer with metadata and/or bounds" 110 (e.g., capability) is an operand of an (e.g., supervisor level or user level) instruction (e.g., having a mnemonic of LoadData) that is to load the data and/or instructions (e.g., an object) protected by the metadata and/or bounds from the memory 120 into register(s) 112. In certain examples, the destination storage location (e.g., virtual address) in memory 120 for data and/or instructions (e.g., an object) to-be-protected by the metadata and/or bounds of the "pointer with metadata and/or bounds" 110 is an operand of an (e.g., supervisor level or user level) instruction (e.g., having a mnemonic of StoreData) that is to store the data and/or instructions (e.g., an object) protected by the metadata and/or bounds from the register(s) 112 into memory 120. In certain examples, the instruction is requested for execution by executing OS code 126 (e.g., or some other privileged process authorized to do so) and/or by executing user code 128. In certain examples, an instruction set architecture (ISA) includes one or more instructions for manipulating the metadata and/or bounds field(s) (e.g., the fields in FIGS. 2A-4), e.g., to set the metadata and/or bound(s) of an object. In certain example, an instruction set architecture (ISA) includes one or more instructions for manipulating the capability field(s) (e.g., the fields in FIGS. 2A-4), e.g., to set the metadata and/or bound(s) of an object in memory.

In certain examples, metadata (e.g., capability) management circuit 108 is to enforce security properties on changes to metadata (e.g., capability data), for example, for the execution of a single capability instruction, by enforcing: (i) provenance validity that ensures that valid capabilities can only be constructed by instructions that do so explicitly (e.g., not by byte manipulation) from other valid capabilities (e.g., with this property applying to capabilities in registers and in memory), (ii) capability monotonicity that ensures, when any instruction constructs a new capability (e.g., except in sealed capability unsealing and invocation and exception raising), it cannot exceed the permissions and bounds of the capability from which it was derived, and/or (iii) reachable capability monotonicity that ensures, in any execution of arbitrary code, until execution is yielded to another domain, the set of reachable capabilities (e.g., those accessible to the current program state via registers, memory, sealing, unsealing, and/or constructing sub-capabilities) cannot increase.

In certain examples, metadata (e.g., capability) management circuit 108 (e.g., at boot time) provides initial capabilities to the firmware, allowing data access and instruction fetch across the full address space. Additionally, all tags are cleared in memory in certain examples. Further capabilities can then be derived (e.g., in accordance with the monotonicity property) as they are passed from firmware to boot loader, from boot loader to hypervisor, from hypervisor to the OS, and from the OS to the application. At each stage in the derivation chain, bounds and permissions may be restricted to further limit access. For example, the OS may assign capabilities for only a limited portion of the address space to the user software, preventing use of other portions of the address space. In certain examples, capabilities carry with them intentionality, e.g., when a process passes a capability as an argument to a system call, the OS kernel can use only that capability to ensure that it does not access other process memory that was not intended by the user process (e.g., even though the kernel may in fact have permission to access the entire address space through other capabilities it holds). In certain examples, this prevents "confused deputy" problems, e.g., in which a more privileged party uses an excess of privilege when acting on behalf of a less privileged party, performing operations that were not intended to be authorized. In certain examples, this prevents the kernel from overflowing the bounds on a user space buffer when a pointer to the buffer is passed as a system-call argument. In certain examples, these architectural properties of a metadata (e.g., capability) management circuit 108 provide the foundation on which a capability-based OS, compiler, and runtime can implement a certain programming language (e.g., C and/or C++) language memory safety and compartmentalization.

In certain examples, the capability points to an object that is stored in multiple lines of data. For example, a block of memory may be lines 1 and 2 of data of the (e.g., physical) addressable memory 122 of memory 120 having an address 124 to one (e.g., the first) line (e.g., line 1). Certain examples have a memory of a total size X, where X is any positive integer.

In certain examples, the capability is stored in a single line of data (or less than a single line of data). In certain examples, the capability is stored in multiple lines of data. In certain examples, capabilities (e.g., one or more fields thereof) themselves are also stored in memory 120, for example, in a data structure (e.g., table) for capabilities. In certain examples, a (e.g., validity) tag is stored in data structure for a capability stored in memory. In certain examples, tags (e.g., in data structure) are not accessible by non-capability (e.g., load and/or store) instructions. In certain examples, a (e.g., validity) tag is stored along with the capability stored in memory (e.g., in one contiguous block).

Depicted hardware processor 100 includes one or more registers 112, for example, general purpose (e.g., data) register(s) 114 (e.g., registers RAX 114A, RBX 114B, RCX 114C, RDX 114D, etc.) and/or (optional) (e.g., dedicated for use with metadata (e.g., capabilities)) metadata (e.g., capabilities) register(s) 116 (e.g., registers CAX 116A, CBX 116B, CCX 116C, CDX 116D, etc.).

Hardware processor 100 includes a coupling (e.g., connection) to memory 120. In certain examples, memory 120 is a memory local to the hardware processor (e.g., system memory). In certain examples, memory 120 is a memory separate from the hardware processor, for example, memory of a server. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain examples herein.

In certain examples, an indication (e.g., name) of the destination register for data and/or instructions (e.g., an object) protected by the metadata and/or bounds of the "pointer with metadata and/or bounds" 110 in register(s) 112 is an operand of an (e.g., supervisor level or user level) instruction (e.g., having a mnemonic of LoadData) that is to load the data and/or instructions (e.g., an object) to-be-protected by the metadata and/or bounds of the "pointer with metadata and/or bounds" 110 from the memory 120 into register(s) 112. In certain examples, an indication (e.g., name) of the source register for data and/or instructions (e.g., an object) to-be-protected by the metadata and/or bounds of the "pointer with metadata and/or bounds" 110 in register(s) 112 is an operand of an (e.g., supervisor level or user level) instruction (e.g., having a mnemonic of StoreData) that is to store the data and/or instructions (e.g., an object) from the register(s) 112 into memory 120.

In certain examples, metadata (e.g., capability) management circuit 108 uses bounds-based access control for enforcing memory safety, e.g., and low-overhead compartmentalization. Examples herein are directed to metadata (e.g., capability) management circuit 108 for implementing non-redundant metadata storage in memory 120 addressed by a pointer 110 including a bounds field (e.g., a capability including a bounds field). Examples herein are directed to metadata (e.g., capability) management circuit 108 for implementing non-redundant metadata storage in memory 120 that is addressed by a pointer 110 including a bounds field and a metadata field (e.g., a capability including a bounds field and a metadata field), and thus do not waste memory or (e.g., unduly) limit the amount of metadata that can be associated with each object in memory. Examples herein are directed to metadata (e.g., capability) management circuit 108 for implementing non-redundant security metadata storage in memory 120 that is addressed by a pointer 110 including a bounds field and a security field (e.g., a capability including a bounds field and a security field (e.g., validity tag)), and thus provide enhanced security (e.g., via security metadata) and do not waste memory or limit the amount of metadata that can be associated with each object in memory.

The circuitry, methods, and a storage format for implementing non-redundant metadata storage in memory disclosed herein are improvements to the functioning of a processor (e.g., of a computer) itself, e.g., they are improvements to the functioning of a processor (e.g., of a computer) itself as they provide enhanced security (e.g., via security metadata) and do not waste memory or limit the amount of metadata that can be associated with each object in memory. Examples herein are improvements to the functioning of a processor (e.g., of a computer) itself as they allow more efficient utilization of memory.

A capability may have different formats and/or fields. In certain examples, a capability is more than twice the width of a native (e.g., integer) pointer type of the baseline architecture, for example, 128-bit or 129-bit capabilities on 64-bit platforms, and 64-bit or 65-bit capabilities on 32-bit platforms. In certain examples, each capability includes an (e.g., integer) address of the natural size for the architecture (e.g., 32 or 64 bit) and additional metadata (e.g., that is compressed in order to fit) in the remaining (e.g., 32 or 64) bits of the capability. In certain examples, each capability includes (or is associated with) a (e.g., 1-bit) validity "tag" whose value is maintained in registers and memory by the architecture (e.g., by metadata (e.g., capability) management circuit 108). In certain examples, each element of the capability contributes to the protection model and is enforced by hardware (e.g., metadata (e.g., capability) management circuit 108).

In certain examples, capability compression reduces the memory footprint of capabilities, e.g., such that the full capability, including address, permissions, and bounds fits within a certain width (e.g., 128 bits plus a 1-bit out-of-band tag). In certain examples, capability compression takes advantage of redundancy between the address and the bounds, which occurs where a pointer typically falls within (or close to) its associated allocation. In certain examples, the compression scheme uses a floating-point representation, allowing high-precision bounds for small objects, but uses stronger alignment and padding for larger allocations.

FIG. 2A is a schematic illustration of an example format of a pointer with bounds (e.g., a capability) including a validity tag 110A field, a bounds 110B field, and an address 110C (e.g., virtual address) field according to examples of the disclosure.

In certain examples, the format of a pointer with bounds (e.g., a capability) includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space to which the capability authorizes access (e.g., loads, stores, instruction fetches, or other operations). An address 110C (e.g., virtual address) for the address of the capability protected data (e.g., object).

In certain examples, the validity tag 110A provides integrity protection, the bounds 110B limits how the value can be used (e.g., for example, for memory access), and/or the address 110C is the memory address storing the corresponding data (or instructions) protected by the capability.

FIG. 2B illustrates an example format of a pointer with bounds (e.g., a capability) including a validity tag 110A field, a permission(s) 110D field, an object type 110E field, a version field 110F, a bounds 110B field, and an address 110C field according to examples of the disclosure In certain examples, the format of a pointer with bounds (e.g., a capability) includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space to which the capability authorizes access (e.g., loads, stores, instruction fetches, or other operations). An address 110C (e.g., virtual address) for the address of the capability protected data (e.g., object). Permissions 110D include a value (e.g., mask) that controls how the capability can be used, e.g., by restricting loading and storing of data and/or capabilities or by prohibiting instruction fetch. An object type 110E that identifies the object, for example (e.g., in a (e.g., C++) programming language that supports a "struct" as a composite data type (or record) declaration that defines a physically grouped list of variables under one name in a block of memory, allowing the different variables to be accessed via a single pointer or by the struct declared name which returns the same address), a first object type may be used for a struct of people's names and a second object type may be used for a struct of their physical mailing addresses (e.g., as used in an employee directory). In certain examples, if the object type 110E is not equal to a certain value (e.g., −1), the capability is "sealed" (with this object type) and cannot be modified or dereferenced. Sealed capabilities can be used to implement opaque pointer types, e.g., such that controlled non-monotonicity can be used to support fine-grained, in-address-space compartmentalization. In some examples, instructions accepting the capability as an operand specify allowable types that a particular sequence of code can operate upon, e.g., and the processor may generate an exception if the type encoded into metadata stored alongside the object does not match any of the specified allowable types. A version field 110F to store a version identifier (e.g., MCD value discussed herein).

In certain examples, permissions 110D include one or more of the following: "Load" to allow a load from memory protected by the capability, "Store" to allow a store to memory protected by the capability, "Execute" to allow execution of instructions protected by the capability, "LoadCap" to load a valid capability from memory into a register, "StoreCap" to store a valid capability from a register into memory, "Seal" to seal an unsealed capability, "Unseal" to unseal a sealed capability, "System" to access system registers and instructions, "BranchSealedPair" to use in an unsealing branch, "CompartmentID" to use as a compartment ID, "MutableLoad" to load a (e.g., capability) register with mutable permissions, and/or "User[N]" for software defined permissions (where N is any positive integer greater than zero).

In certain examples, the validity tag 110A provides integrity protection, the permission(s) 110D limits the operations that can be performed on the corresponding data (or instructions) protected by the capability, the bounds 110B limits how the value can be used (e.g., for example, for memory access), the object type 110E supports higher-level software encapsulation, and/or the address 110C is the memory address storing the corresponding data (or instructions) protected by the capability.

In certain examples, a capability (e.g., value) includes one or any combination of the following fields: address value (e.g., 64 bits), bounds (e.g., 87 bits), flags (e.g., 8 bits), object type (e.g., 15 bits), permissions (e.g., 16 bits), tag (e.g., 1 bit), global (e.g., 1 bit), and/or executive (e.g., 1 bit). In certain examples, the flags and the lower 56 bits of the "capability bounds" share encoding with the "capability value".

Figure 3:
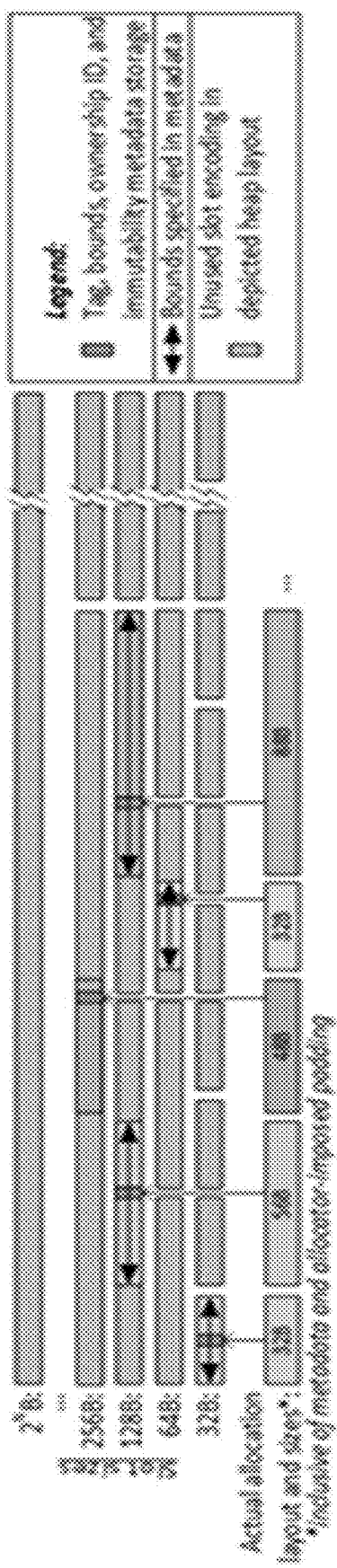
FIG. 3 is a schematic illustration of memory allocations in an implementation of cryptographic data objects page conversion in accordance with some examples.

FIG. 3 is a schematic illustration of memory allocation 300 in an implementation of cryptographic data objects page conversion in accordance with some examples. Referring to FIG. 3, cryptographic computing provides object-based data encryption and mitigates spatial and temporal safety vulnerabilities for sensitive heap allocations. More particularly, cryptographic computing assigns each object to a power-of-two-aligned slot that best fits the memory space requirements of the object, associated a cryptographic pointer encoding including the power of two slot and version number, binds the encryption of that object to its unique slot and version number, and may store metadata inline with object allocations. In some examples described herein, metadata stored with object allocations may be extended to store ownership identifiers (IDs) associated with the data. Allocations are not necessarily assigned to the next larger slot size than the allocation size, since they may cross power-of-two alignment boundaries for some of the next possible slot sizes. Each allocation may be assigned a slot size that entirely fits the allocation at its particular location without crossing any slot boundaries at that assigned size. Smaller slots than illustrated here could also be supported similarly.

Figure 4:
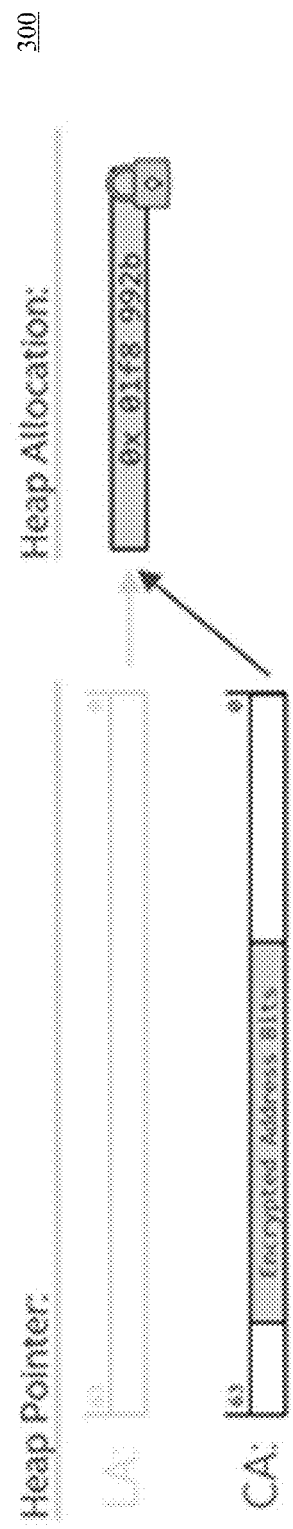
FIG. 4 is a schematic illustration of pointer access in an implementation of cryptographic data objects page conversion in accordance with some examples.

FIG. 4 is a schematic illustration of pointer access 400 in an implementation of cryptographic data objects page conversion in accordance with some examples. Referring to FIG. 4, cryptographic computing replaces the linear address (LA) used to access a heap allocation by a cryptographic address (CA). In some embodiments the cryptographic address is an encoded 64-bit pointer that is partially encrypted to mitigate pointer forgery. The lower bits of the cryptographic address are unencrypted to allow programs to freely index within the heap allocation without needed to first decrypt the pointer. This uniquely encrypted cryptographic address is used as a tweak to encrypt the data within the heap allocation (alongside a data encryption key). This design achieves unique, per-object based data encryption for heap memory where each cryptographic pointer acts as a unforgeable, unique key to encrypt/decrypt the associated data object.

Data encryption for the corresponding heap allocation is bound to the encrypted pointer. Thus, any misuse of a pointer to reference a different object will result in incorrect encryption or decryption of that other object. This property directly mitigates spatial safety vulnerabilities, and it can also mitigate use after free UAF. If a slot is reused while some dangling pointer still references that exact slot, then UAF may still occur, but the allocator can seek to maximize the interval between reuse of a particular slot.

In some examples temporarily quarantining a slot in memory does not imply quarantining the underlying physical memory, which may still be used by assigning it to a different slot. This property provides unique per-object encryption for sensitive heap allocations. Because the encryption for each heap allocation is tweaked by its unique cryptographic address, sensitive values are encrypted differently across different heap allocations in memory. This approach may adequately diversify heap memory, thereby obviating the need for cryptographic salts in the data encryption scheme. Embodiments may additionally include a version number within the cryptographic pointer in order to cryptographically distinguish objects allocated over time, assigning a new version number to each new allocation for the same memory location, which in turn creates a unique tweak for encrypting the object in memory even if the bounds and location are the same as previous versions of the same object.

Figure 5:
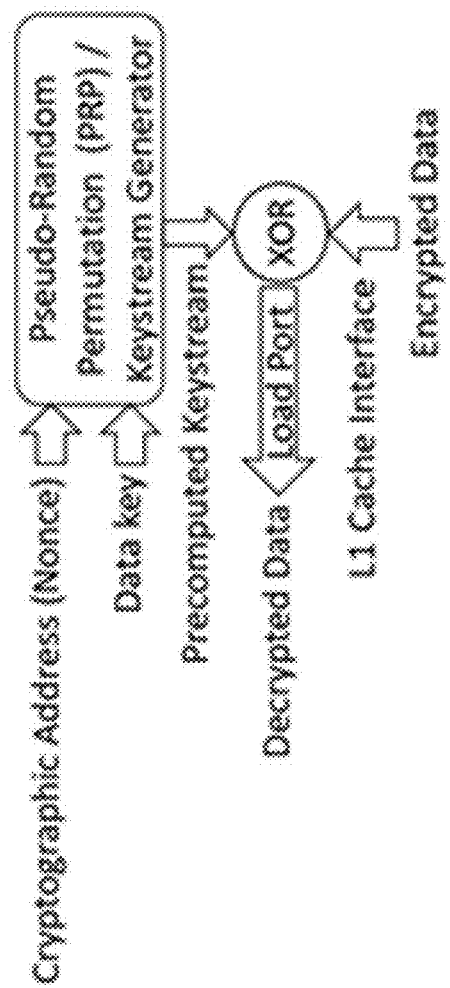
FIG. 5 is a schematic illustration of an encryption scheme in an implementation of cryptographic data objects page conversion in accordance with some examples.

FIG. 5 is a schematic illustration of an encryption scheme 500 in an implementation of data oblivious cryptographic computing in accordance with some examples. Referring to FIG. 5, In some examples the cryptographic computing data encryption scheme uses the cryptographic address as a nonce or "tweak", alongside a data key to generate a precomputed keystream. This keystream may be XOR'd with data in the load pipeline when read from an L1 cache interface. Alternative embodiments may use a block cipher to encrypt the data.

Cryptographic Data Objects Page Conversion

As described briefly above, Cryptographic Capability Computing ($C^3$) defines per-data object encryption using cryptographic pointers. Using a pointer as a tweak-key to unlock individual data objects in a memory space can create compatibility problems e.g., for legacy software, aliasing, and legacy device input/output (I/O). For example, in a Windows-based operating system, the purpose of a memory allocation (e.g. on malloc or new instruction) through the heap manager is unknown. These memory allocations may be used in normal program flows or may be shared for device input/output and/or direct memory access (DMA), or otherwise aliased in a way that breaks the binding between a pointer (i.e., cryptographic capability) and its associated cryptographic data object (encrypted object/allocation.

Figures 6A, 6B:
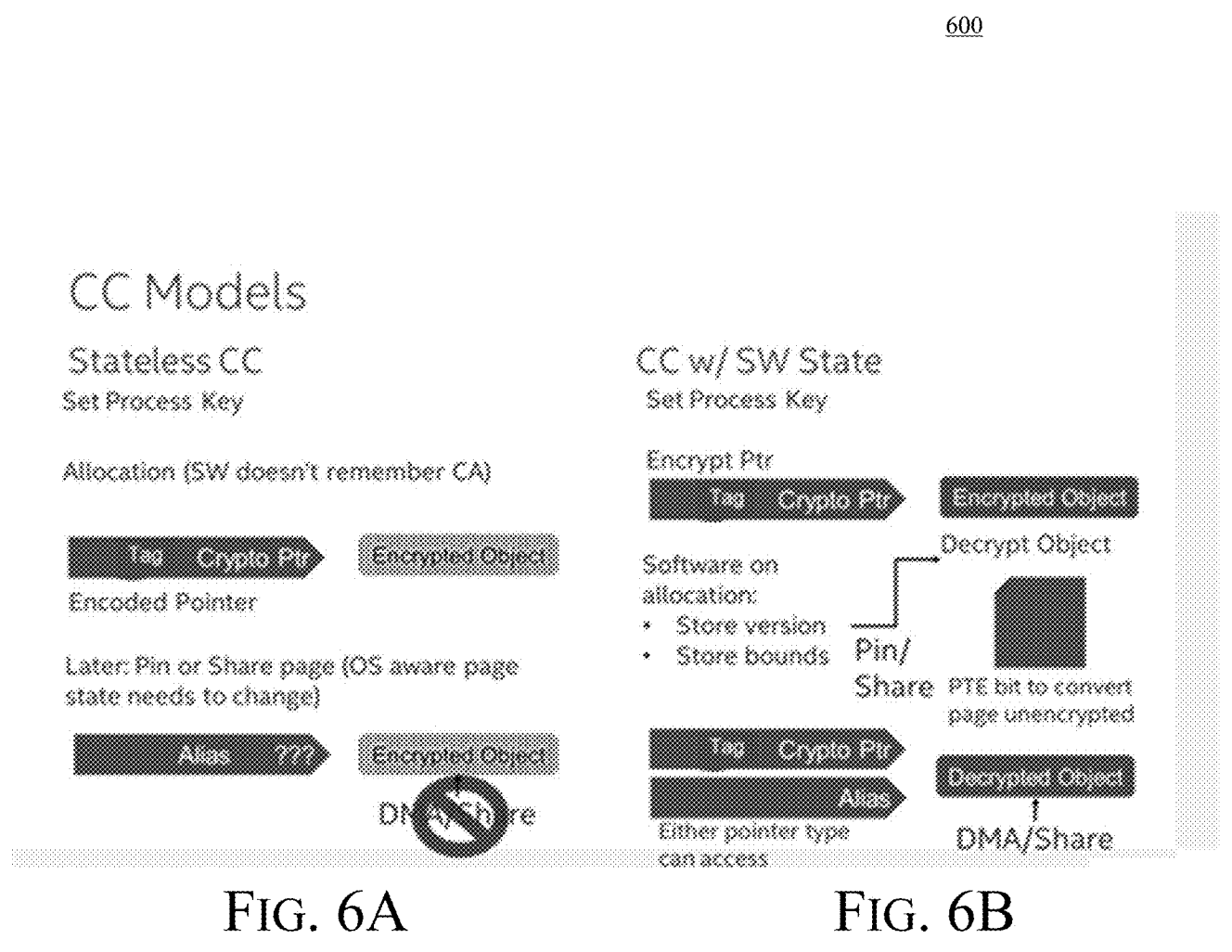

FIG. 6A depicts various examples of situations 600 in which the binding between a cryptographic pointer and the encrypted data object may be broken. Referring to FIG. 6A, in the cryptographic computing model, a process key is set. Upon allocation, stateless software does not remember the cryptographic address of a data object in memory. In a cryptographic computing environment, an encoded pointer includes a tag assigned to an encrypted object. Subsequently, if the page is stored in memory as plaintext, the operating system is aware that the page state needs to change. Upon aliasing, a separate pointer to the encrypted data object may be generated, however, the plaintext for the encrypted data object may not be accessible through direct memory access (DMA) techniques, for sharing, or for other aliased accesses.

Figure 7:
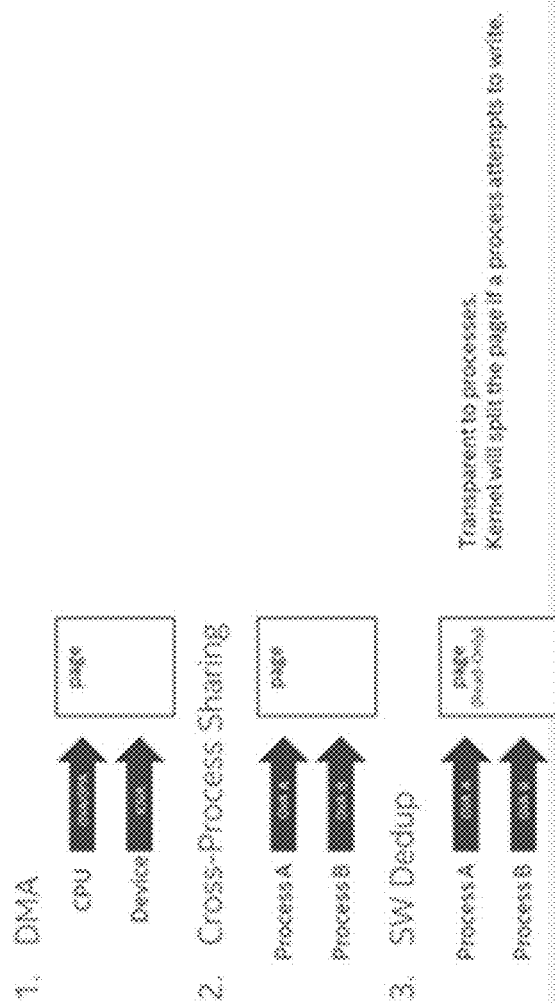
FIG. 7 is a schematic illustration of pointer aliasing in accordance with some examples.

FIG. 7 shows three different example usages 700 for software pointer aliasing. In a Direct Memory Access (DMA) model, a memory page is accessible by both a processor core and a device. In a non-Shared Virtual Memory (SVM) mode, the page would be pinned for input/output and the device driver would allocate a new set of page tables and a new pointer, referred to as an input/output virtual address (IOVA) for the device to access the page. In a cross-process memory sharing mode a process A requests from the kernel to share a page or memory segment with process B. The kernel achieves this by mapping the same page in both process A's page tables and process B's page tables. In a software deduplication (SW dedup) mode, the kernel merges common memory pages without a process's knowledge or consent. Usually, this is done at a) a library load time, when the kernel checks if the library is already loaded in memory, and if so, the kernel would deduplicate the memory, or b) as a background process which manually reads every page in memory (usually under the same virtual machine (VM) and compares with the rest of memory to find the same page and merge them into one.

Techniques described herein enable the conversion of pages containing cryptographic data objects into a plaintext allowing for legacy device input/output operations and aliasing. In some examples a page table bit may be used to indicate that the contents of a page have been transformed/decrypted. Alternatives and methods for tracking and managing per-object cryptographic state and metadata are also described. Subject matter described herein allows cryptographic data objects to be used with legacy software and input/output operations by allowing data objects on converted pages to be accessed by legacy input/output techniques and used with legacy software using conventional canonical addressing as well as cryptographic addressing.

By way of overview, referring to FIG. 6B, in a cryptographic computing environment in which a software state is preserved, a process key is set and an encoded pointer includes a tag which identifies an encrypted object. Upon allocation, software stores a version and bounds associated with the cryptographic pointer. When the page is stored in memory as plaintext even if accessed using cryptographic addresses, a page table entry bit is set and the encrypted data object may be decrypted. The encrypted data object remains accessible by the cryptographic pointer. Upon aliasing, a separate pointer to the encrypted data object may be generated. The decrypted data object may be accessible through the cryptographic pointer, an aliased pointer, or direct memory access (DMA) techniques or for sharing.

Operations to implement cryptographic data objects page conversion in accordance with some examples are described with reference to FIG. 8 and FIG. 9. The operations may be implemented as instructions to be executed by a processor, i.e., software or firmware, or by a programmable device such as a field programmable gate array (FPGA) or may be reduced to dedicated hardware circuitry.

Figure 8:
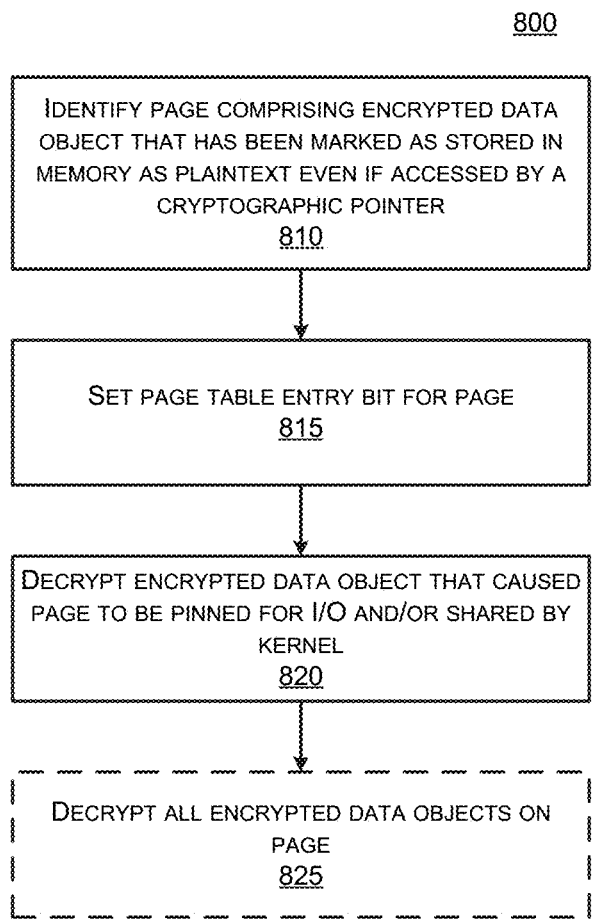
FIG. 8 is a flowchart illustrating operations in a method to implement cryptographic data objects page conversion in accordance with some examples.

Referring to FIG. 8, at operation 810 a page in memory that has been stored in memory as plaintext even if accessed using cryptographic addresses is identified. In some examples operation 810 may be implemented in response to a page in memory being pinned for input/output or being shared between processes by a kernel.

At operation 815 a page table entry bit is set to indicate that that the page has been marked as stored in memory as plaintext even if accessed using cryptographic addresses and therefore that a memory allocation on the page may be affected. In some examples the PTE bit may be set to a binary value of "1" to indicate that the page has been stored in memory as plaintext even if accessed using cryptographic addresses and hence should be accessed as plaintext. This allows the kernel to simultaneously support memory accesses from cryptographic pointers, plaintext pointers, and direct memory accesses (DMA) to the same underlying plaintext data in memory.

At operation 820 the encrypted data object that cause the page to be stored in memory as plaintext even if accessed using cryptographic addresses is decrypted. In some examples, when a page is pinned for input/output, the specific input/output buffer (or buffers) are specified by software to the pinning application programming interface (API), so the operating system can access the input/output buffer is and can obtain the cryptographic pointer for the data object. Given this information, that specific input/output buffer may be decrypted and input/output direct memory access (DMA) with a device may commence to that buffer, which is now a plaintext buffer. The operating system (OS) may keep track of just these decrypted buffers. Optionally, at operation 825, all encrypted data objects on the page may be decrypted.

In subsequent input/output processing, whenever a cryptographic pointer is used to access anything on a page for which the PTE bit set, an exception will be generated. The exception will be detected (e.g., by software) and the cryptographic pointer will be passed to the exception handler. The exception handler may then allow the access to continue using the cryptographic pointer if the buffer is still encrypted. By contrast, if the access is to a decrypted input/output buffer, but using a cryptographic pointer, then the exception handler may cause the data to be accessed using a plaintext pointer, rather than a cryptographic pointer, so the data will not be decrypted by the processor again. This protocol permits buffer-by-buffer control but will cause an exception on every load/store instruction executed by the processor using the cryptographic pointers on a page with a PTE bit set.

Figure 9:
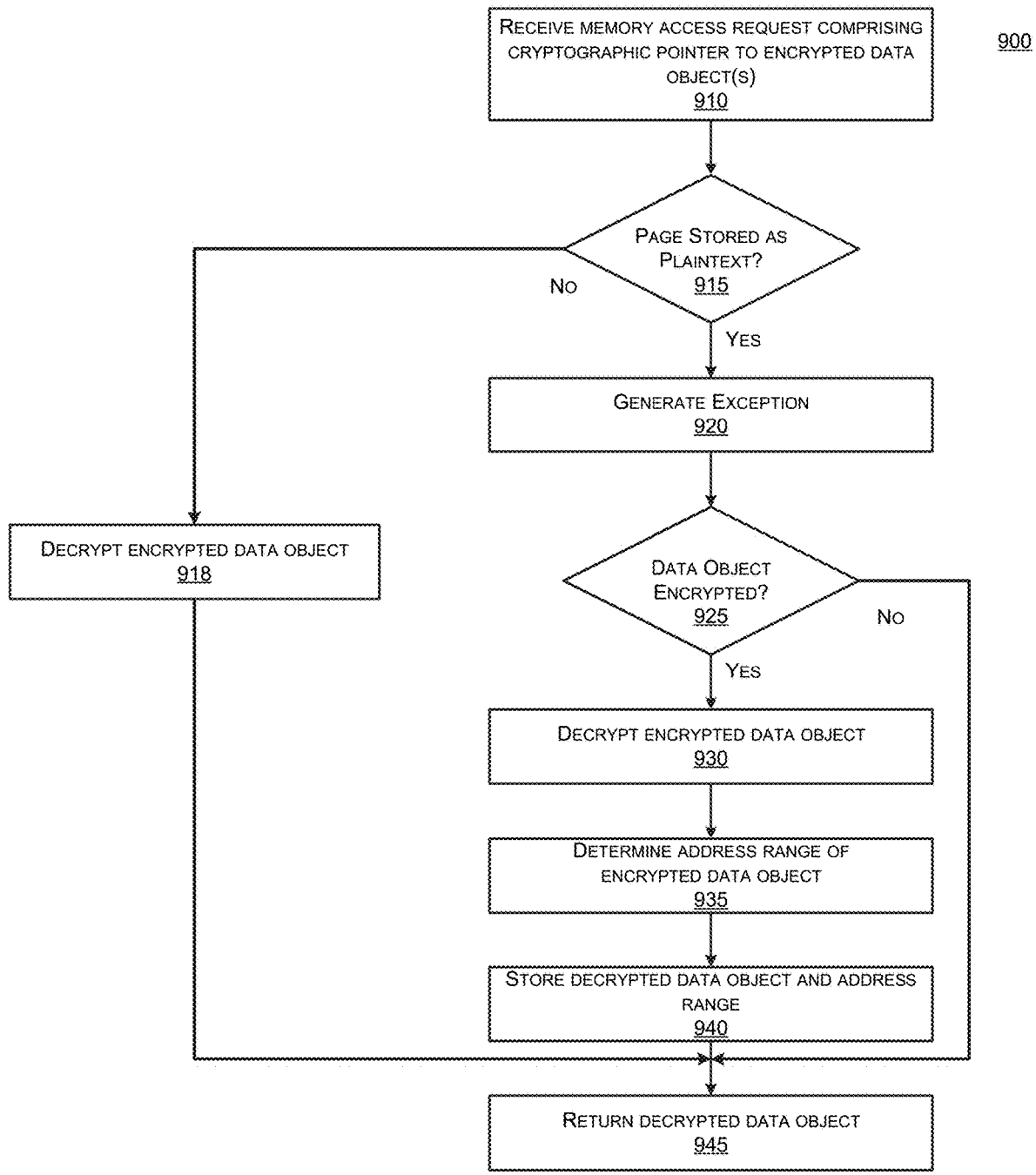
FIG. 9 is a flowchart illustrating operations in a method to implement cryptographic data objects page conversion in accordance with some examples.

A method 900 to implement this protocol is illustrated in FIG. 9. Referring to FIG. 9, at operation 910 a memory access request comprising a cryptographic pointer to an encrypted data object is received. At operation 915 it is determined whether the page has been marked as being stored in memory as plaintext even if accessed using cryptographic addresses. In some examples this may be determined by examining the PTE bit set in operation 815 to determine whether the PTE bit is set to a value that indicates the page has been marked as being stored in memory as plaintext even if accessed using cryptographic addresses.

If, at operation 915, the PTE bit is not set to a value which indicates that the page has been marked as being stored in memory as plaintext even if accessed using cryptographic addresses, then exception processing is bypassed and operation 918 is implemented to decrypt the encrypted data object, whereupon operation 945 is implemented and the decrypted data object is returned. By contrast, if at operation 915 the PTE bit is set to a value which indicates that the page has been marked as being stored in memory as plaintext even if accessed using cryptographic addresses then operation 920 is implemented and an exception is generated. The exception will be detected (e.g., by software) and the cryptographic pointer will be passed to the exception handler.

At operation 925 it is determined whether the data object enumerated in the memory access request received in operation 910 is encrypted. If, at operation 925, the data object is not encrypted then decryption operations are bypassed. By contrast, if at operation 925 the data object is encrypted then operation 930 is implemented and the encrypted data object is decrypted, e.g., using information in the cryptographic pointer received in operation 910. At operation 935 the address range of the data object is determined, e.g., using information in the cryptographic pointer received in operation 910 or using metadata stored by the allocator associated with the cryptographic pointer.

At operation 940 the decrypted data object and the address range are stored in memory. In some examples, the range of addresses may be stored in a processor register (or registers) and may be used to prevent further exceptions when software accesses an address within the specified address range. Alternatively, an exception list may be maintained by the processor for only those cryptographic addresses that that are accessing decrypted objects so the processor will not attempt to decrypt the data.

At operation 945 the decrypted data object is returned in response to the memory access request received in operation 910. In the event that decryption operations were bypassed at operation 925 the exception handler will cause the data to be accessed using a plaintext pointer, rather than the cryptographic pointer, so the data will not be decrypted by the processor again.

Thus, the operations depicted in FIG. 9 enable exception processing for memory access requests that include a cryptographic pointer. Pursuant to the exception processing, the encrypted data object may be decrypted and stored in a plaintext buffer. Subsequently, memory access requests using Linear Addresses (LA) and DMA requests via a physical address (PA) can directly access the plaintext buffers on the page without causing an exception or fault.

In some examples, when a page is pinned, software (e.g., the kernel) may check data structures to determine the bounds and versions of data objects stored on that page and decrypt them all, as indicated in operation 825. In some examples a page may be taken offline (i.e., not-present) during the decryption process to prevent any simultaneous accesses by other threads and/or cores until the decryption is completed. This is accomplished by interrupting all other hardware threads on the machine with an indication that the paging structures have been updated. Each hardware thread may then flush TLB (Translation Lookaside Buffer) state or invalidate the modified pages to insure the TLB state is current with the current page tables and the contents of the page in memory are likewise coherent and in its plaintext form. When the page is decrypted (e.g., all data objects on the page are individually decrypted using the stored cryptographic address information), then the PTE bit can be set to indicate the page is decrypted and is now in plaintext and the page can be put back online (i.e., present). This indicates to the processor not to decrypt the contents of the page even when accessed by a cryptographic address (CA) as the contents are already decrypted. Meanwhile, linear addresses and physical addresses can freely access the decrypted contents of the converted page. Converting pages may require cross core shootdowns, so a page may need to be set to be not-present until decryption is complete to prevent software from accessing pages that are only partially converted. Other embodiments may re-encrypt the contents of a page using a different key or tweak that is also accessible for DMA, for example, using a shared DMA key, to allow IO device access to data on the page while still preserving confidentiality. In this case both cryptographic pointers and canonical plaintext pointers will use the shared DMA key to decrypt the data on the page.

Referring to FIG. 10, in some examples an extension to tripwires may provide a way for pages to be decrypted on demand to provide legacy compatibility without storing object-level information. Referring to FIG. 10, a data structure 1000 for use with a tripwire may comprise a first tripwire 1010A, a memory allocation 1020, and a second tripwire 1010B. First tripwire 1010A may comprise a tripwire prefix derived from the tripwire value 1012A, a below power version (BPV) 1014A, and an above power version (APV) 1016A. Similarly, second tripwire 1010B may comprise a tripwire prefix derived from the tripwire value 1012B, a below power version (BPV) 1014B, and an above power version (APV) 1016B. In some examples the data structure may utilize six bits for power and four bits for version. Setting the values of APV 1016A, 1016B equal to the values of BPV 1014A, 1014B may allow tripwires to be used in an intra-object fashion.

In some examples, the slot special information may be extracted by identifying object bounds, e.g., by scanning memory values for a tripwire (i.e., special memory values). The tag and power information for the subsequent allocation may be stored in the least significant 20 bits of each tripwire. Adversaries are disallowed from reading out the version info by the tripwire checks. Only the operating system can override the tripwire checks to read the version when decrypting the memory. Another flag bit in the tripwire may be set to indicate that the subsequent range of memory until the next tripwire is unallocated and/or freed, and hence can be skipped for decryption. In some embodiments, the on-demand decryption handler may derive the power value for an allocation by scanning for tripwires at both endpoints without storing the power value in each terminating tripwire. However, storing the power value in each terminating tripwire enables the on-demand decryption handler to decrypt a portion of the allocation, e.g., if the allocation spans multiple pages, after finding just one of the terminating tripwires. Another alternative is to store the power value in just one of the terminating tripwires, e.g., just the tripwire preceding the allocation. However, storing the power value in both terminating tripwires may enable more efficient scans for the tripwire values, e.g., by starting the scan at the supplied cryptographic address and moving away from the midpoint of the naturally aligned power-of-two slot specified by the cryptographic address, since it may be more likely for a given cryptographic address to be closer to the tripwire on the same side of the midpoint as the cryptographic address. If some embodiments only support on-demand decryption for allocations up to a particular slot size, e.g., only up to a page in size, then the stored power value in tripwires can be shrunken to just encode slot sizes up to the maximum for which on-demand decryption is supported.

A dedicated instruction may be used to initialize a tripwire at a location specified by an operand with the appropriate power values for the associated allocation(s) supplied as operand(s).

Referring to FIG. 11, to address the issue of tripwires expanding exact page allocations (i.e., to allow tripwires in this case to perform decryption on demand), the tripwire location bitmap may be made hierarchical, with a separate leaf bitmap per page. The parent-level tripwire directory entry 1100 may comprise a reserved field 1110, a whole-page version and power indicator 1112 (15 bits), a whole page allocation indicator 1114 (1 bit), and a tripwire present in page indictor 1116 (1 bit). The tripwire locator table 1130 may comprise a first field 1140 which comprises tripwire directory entries (16 bits per page) and a second field 1144 which comprises tripwire bitmaps (64 bytes per page). In some examples the tripwire bitmaps may contain unused gaps for pages with no tripwires, and for whole-page allocations.

In some examples, the tripwire bitmaps may also support accelerated scanning for tripwires since the bitmap would show the scanner exactly where to find tripwires as well as which pages contain no tripwires.

Figure 12:
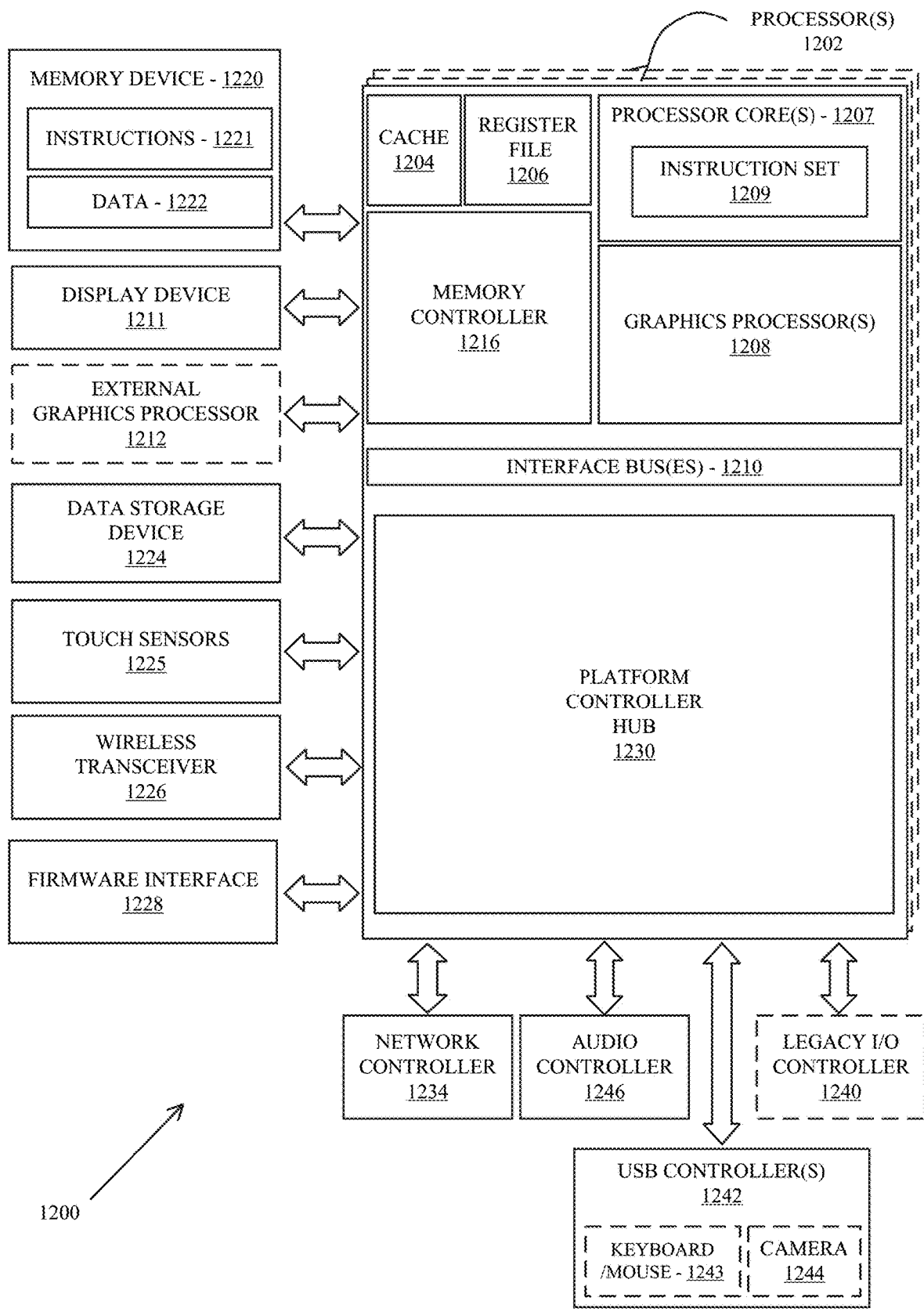
FIG. 12 is a schematic illustration of a computing architecture which may be adapted to implement cryptographic data objects page conversion in accordance with some examples.

FIG. 12 illustrates an embodiment of an exemplary computing architecture that may be suitable for implementing various embodiments as previously described. In various embodiments, the computing architecture 1200 may comprise or be implemented as part of an electronic device. In some embodiments, the computing architecture 1200 may be representative, for example of a computer system that implements one or more components of the operating environments described above. In some embodiments, computing architecture 1200 may be representative of one or more portions or components of a digital signature signing system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 includes one or more processors 1202 and one or more graphics processors 1208, and may be a single processor desktop system, a multiprocessor workstation system, or a server system having a large number of processors 1202 or processor cores 1207. In on embodiment, the system 1200 is a processing platform incorporated within a system-on-a-chip (SoC or SOC) integrated circuit for use in mobile, handheld, or embedded devices.

An embodiment of system 1200 can include, or be incorporated within a server-based gaming platform, a game console, including a game and media console, a mobile gaming console, a handheld game console, or an online game console. In some embodiments system 1200 is a mobile phone, smart phone, tablet computing device or mobile Internet device. Data processing system 1200 can also include, couple with, or be integrated within a wearable device, such as a smart watch wearable device, smart eyewear device, augmented reality device, or virtual reality device. In some embodiments, data processing system 1200 is a television or set top box device having one or more processors 1202 and a graphical interface generated by one or more graphics processors 1208.

In some embodiments, the one or more processors 1202 each include one or more processor cores 1207 to process instructions which, when executed, perform operations for system and user software. In some embodiments, each of the one or more processor cores 1207 is configured to process a specific instruction set 1209. In some embodiments, instruction set 1209 may facilitate Complex Instruction Set Computing (CISC), Reduced Instruction Set Computing (RISC), or computing via a Very Long Instruction Word (VLIW). Multiple processor cores 1207 may each process a different instruction set 1209, which may include instructions to facilitate the emulation of other instruction sets. Processor core 1207 may also include other processing devices, such a Digital Signal Processor (DSP).

In some embodiments, the processor 1202 includes cache memory 1204. Depending on the architecture, the processor 1202 can have a single internal cache or multiple levels of internal cache. In some embodiments, the cache memory is shared among various components of the processor 1202. In some embodiments, the processor 1202 also uses an external cache (e.g., a Level-3 (L3) cache or Last Level Cache (LLC)) (not shown), which may be shared among processor cores 1207 using known cache coherency techniques. A register file 1206 is additionally included in processor 1202 which may include different types of registers for storing different types of data (e.g., integer registers, floating point registers, status registers, and an instruction pointer register). Some registers may be general-purpose registers, while other registers may be specific to the design of the processor 1202.

In some embodiments, one or more processor(s) 1202 are coupled with one or more interface bus(es) 1210 to transmit communication signals such as address, data, or control signals between processor 1202 and other components in the system. The interface bus 1210, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 1202 include an integrated memory controller 1216 and a platform controller hub 1230. The memory controller 1216 facilitates communication between a memory device and other components of the system 1200, while the platform controller hub (PCH) 1230 provides connections to I/O devices via a local I/O bus.

Memory device 1220 can be a dynamic random-access memory (DRAM) device, a static random-access memory (SRAM) device, flash memory device, phase-change memory device, or some other memory device having suitable performance to serve as process memory. In one embodiment the memory device 1220 can operate as system memory for the system 1200, to store data 1222 and instructions 1221 for use when the one or more processors 1202 executes an application or process. Memory controller hub 1216 also couples with an optional external graphics processor 1212, which may communicate with the one or more graphics processors 1208 in processors 1202 to perform graphics and media operations. In some embodiments a display device 1211 can connect to the processor(s) 1202. The display device 1211 can be one or more of an internal display device, as in a mobile electronic device or a laptop device or an external display device attached via a display interface (e.g., DisplayPort, etc.). In one embodiment the display device 1211 can be a head mounted display (HMD) such as a stereoscopic display device for use in virtual reality (VR) applications or augmented reality (AR) applications.

In some embodiments the platform controller hub 1230 enables peripherals to connect to memory device 1220 and processor 1202 via a high-speed I/O bus. The I/O peripherals include, but are not limited to, an audio controller 1246, a network controller 1234, a firmware interface 1228, a wireless transceiver 1226, touch sensors 1225, a data storage device 1224 (e.g., hard disk drive, flash memory, etc.). The data storage device 1224 can connect via a storage interface (e.g., SATA) or via a peripheral bus, such as a Peripheral Component Interconnect bus (e.g., PCI, PCI Express). The touch sensors 1225 can include touch screen sensors, pressure sensors, or fingerprint sensors. The wireless transceiver 1226 can be a Wi-Fi transceiver, a Bluetooth transceiver, or a mobile network transceiver such as a 3G, 4G, or Long Term Evolution (LTE) transceiver. The firmware interface 1228 enables communication with system firmware, and can be, for example, a unified extensible firmware interface (UEFI). The network controller 1234 can enable a network connection to a wired network. In some embodiments, a high-performance network controller (not shown) couples with the interface bus 1210. The audio controller 1246, in one embodiment, is a multi-channel high definition audio controller. In one embodiment the system 1200 includes an optional legacy I/O controller 1240 for coupling legacy (e.g., Personal System 2 (PS/2)) devices to the system. The platform controller hub 1230 can also connect to one or more Universal Serial Bus (USB) controllers 1242 connect input devices, such as keyboard and mouse 1243 combinations, a camera 1244, or other USB input devices.

The following pertains to further examples.

Example 1 is an apparatus, comprising a computer readable memory; processing circuitry to identify a first page in a computer readable memory communicatively coupled to the apparatus that has been marked as being stored in memory as plaintext, the first page in the computer readable memory comprising at least one encrypted data object; and set a page table entry bit for the first page to a first value which indicates that the first page has been stored in memory as plaintext.

In Example 2, the subject matter of Example 1 can optionally include processing circuitry to receive a first memory access request for the computer readable memory, the first memory access request comprising a first cryptographic pointer to the encrypted data object, the first cryptographic pointer comprising one or more capabilities associated with the encrypted data object; decrypt the at least one encrypted data object using a first encryption key obtained from the cryptographic pointer to generate the decrypted data object; and store the decrypted data object in a computer readable memory.

In Example 3, the subject matter of any one of Examples 1-2 can optionally include processing circuitry to determine, from the first cryptographic pointer, a first address range in the computer readable memory accessible to the first cryptographic pointer; and store, in a computer-readable memory, the first address range.

In Example 4, the subject matter of any one of Examples 1-3 can optionally include processing circuitry to receive a second memory access request for the computer readable memory, the second memory access request comprising a second cryptographic pointer to the encrypted data object; and in response to the second memory access, return the decrypted data object.

In Example 5, the subject matter of any one of Examples 1-4 can optionally include processing circuitry to decrypt at least a portion of the cryptographic pointer to generate a plaintext pointer to the decrypted data object.

In Example 6, the subject matter of any one of Examples 1-5 can optionally processing circuitry to decrypt all data in the first page in the computer readable memory.

In Example 7, the subject matter of any one of Examples 1-6 can optionally include processing circuitry to prevent memory access requests to the first page in the computer readable memory while the data in the first page of the computer readable memory is being decrypted.

Example 8 is a computer-based method, comprising identifying a first page in a computer readable memory communicatively coupled to the apparatus that has been marked as being stored in memory as plaintext, the first page in the computer readable memory comprising at least one encrypted data object; and setting a page table entry bit for the first page to a first value which indicates that the first page has been stored in memory as plaintext.

In Example 9, the subject matter of Example 8 can optionally include receiving a first memory access request for the computer readable memory, the first memory access request comprising a first cryptographic pointer to the encrypted data object, the first cryptographic pointer comprising one or more capabilities associated with the encrypted data object; decrypting the at least one encrypted data object using a first encryption key obtained from the cryptographic pointer to generate the decrypted data object; and storing the decrypted data object in a computer readable memory.

In Example 10, the subject matter of any one of Examples 8-9 can optionally include determining, from the first cryptographic pointer, a first address range in the computer readable memory accessible to the first cryptographic pointer; and storing, in a computer-readable memory, the first address range.

In Example 11, the subject matter of any one of Examples 8-10 can optionally include receiving a second memory access request for the computer readable memory, the second memory access request comprising a second cryptographic pointer to the encrypted data object; and in response to the second memory access, returning the decrypted data object.

In Example 12, the subject matter of any one of Examples 8-11 can optionally include decrypting at least a portion of the cryptographic pointer to generate a plaintext pointer to the decrypted data object.

In Example 13, the subject matter of any one of Examples 8-12 can optionally include decrypting all data in the first page in the computer readable memory.

In Example 14, the subject matter of any one of Examples 8-13 can optionally include prevent memory access requests to the first page in the computer readable memory while the data in the first page of the computer readable memory is being decrypted.

Example 15 is a non-transitory computer readable medium comprising instructions which, when executed by a processor, configure the processor to identify a first page in a computer readable memory communicatively coupled to the apparatus that has been marked as being stored in memory as plaintext, the first page in the computer readable memory comprising at least one encrypted data object; and set a page table entry bit for the first page to a first value which indicates that the first page has been stored in memory as plaintext.

In Example 16, the subject matter of Example 15 can optionally include the subject matter of claim 15, comprising instructions to receive a first memory access request for the computer readable memory, the first memory access request comprising a first cryptographic pointer to the encrypted data object, the first cryptographic pointer comprising one or more capabilities associated with the encrypted data object; decrypt the at least one encrypted data object using a first encryption key obtained from the cryptographic pointer to generate the decrypted data object; and store the decrypted data object in a computer readable memory.

In Example 17, the subject matter of any one of Examples 15-16 can optionally include instructions to determine, from the first cryptographic pointer, a first address range in the computer readable memory accessible to the first cryptographic pointer; and store, in a computer-readable memory, the first address range.

In Example 18, the subject matter of any one of Examples 15-17 can optionally include instructions to receive a second memory access request for the computer readable memory, the second memory access request comprising a second cryptographic pointer to the encrypted data object; and in response to the second memory access, return the decrypted data object.

In Example 19, the subject matter of any one of Examples 15-18 can optionally include instructions to decrypt at least a portion of the cryptographic pointer to generate a plaintext pointer to the decrypted data object.

In Example 20, the subject matter of any one of Examples 15-19 can optionally include instructions to decrypt all data in the first page in the computer readable memory.

In Example 21, the subject matter of any one of Examples 15-20 can optionally include instructions to prevent memory access requests to the first page in the computer readable memory while the data in the first page of the computer readable memory is being decrypted.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition, "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising processing circuitry to:
   identify, in response to a page in memory being pinned for input/output or being shared between processes by kernel, a first page in a computer readable memory communicatively coupled to the apparatus that has been marked as being stored in memory as plaintext, the first page in the computer readable memory comprising at least one encrypted data object; and
   set a page table entry bit for the first page to a first value which indicates that the first page has been stored in memory as plaintext.

2. The apparatus of claim 1, the processing circuitry to:
   receive a first memory access request for the computer readable memory, the first memory access request comprising a first cryptographic pointer to the encrypted data object, the first cryptographic pointer comprising one or more capabilities associated with the encrypted data object;

decrypt the at least one encrypted data object using a first encryption key obtained from the cryptographic pointer to generate the decrypted data object; and store the decrypted data object in a computer readable memory.

3. The apparatus of claim 2, the processing circuitry to:

determine, from the first cryptographic pointer, a first address range in the computer readable memory accessible to the first cryptographic pointer; and store, in a computer-readable memory, the first address range.

4. The apparatus of claim 3, the processing circuitry to:

receive a second memory access request for the computer readable memory, the second memory access request comprising a second cryptographic pointer to the encrypted data object; and in response to the second memory access, return the decrypted data object.

5. The apparatus of claim 2, the processing circuitry to:

decrypt at least a portion of the cryptographic pointer to generate a plaintext pointer to the decrypted data object.

6. The apparatus of claim 1, the processing circuitry to:

decrypt all data in the first page in the computer readable memory.

7. The apparatus of claim 6, the processing circuitry to:

prevent memory access requests to the first page in the computer readable memory while the data in the first page of the computer readable memory is being decrypted.

8. A computer-based method, comprising:

identifying, in response to a page in memory being pinned for input/output or being shared between processes by kernel, a first page in a computer readable memory communicatively coupled to the apparatus that has been stored in memory as plaintext, the first page in the computer readable memory comprising at least one encrypted data object; and setting a page table entry bit for the first page to a first value which indicates that at least one memory allocation in the first page has been stored in memory as plaintext.

9. The method of claim 8, further comprising:

receiving a first memory access request for the computer readable memory, the first memory access request comprising a first cryptographic pointer to the encrypted data object, the first cryptographic pointer comprising one or more capabilities associated with the encrypted data object;

decrypting the at least one encrypted data object using a first encryption key obtained from the cryptographic pointer to generate the decrypted data object; and storing the decrypted data object in the first page in the computer readable memory.

10. The method of claim 9, further comprising:

determining, from the first cryptographic pointer, a first address range in the computer readable memory accessible to the first cryptographic pointer; and storing, in a computer-readable memory, the first address range.

11. The method of claim 10, further comprising:

receiving a second memory access request for the computer readable memory, the second memory access request comprising a second cryptographic pointer to the encrypted data object; and in response to the second memory access, returning the decrypted data object.

12. The method of claim 9, further comprising:

decrypting at least a portion of the cryptographic pointer to generate a plaintext pointer to the decrypted data object.

13. The method of claim 8 further comprising:

decrypting all data in the first page in the computer readable memory.

14. The method of claim 13, further comprising:

preventing memory access requests to the first page in the computer readable memory while the data in the first page of the computer readable memory is being decrypted.

15. A non-transitory computer readable medium comprising instructions which, when executed by a processor, configure the processor to:

identify, in response to a page in memory being pinned for input/output or being shared between processes by kernel, a first page in a computer readable memory communicatively coupled to the apparatus that has been stored in memory as plaintext, the first page in the computer readable memory comprising at least one encrypted data object; and set a page table entry bit for the first page to a first value which indicates that at least one memory allocation in the first page has been stored in memory as plaintext.

16. The computer readable medium of claim 15, comprising instructions to:

receive a first memory access request for the computer readable memory, the first memory access request comprising a first cryptographic pointer to the encrypted data object, the first cryptographic pointer comprising one or more capabilities associated with the encrypted data object;

decrypt the at least one encrypted data object using a first encryption key obtained from the cryptographic pointer to generate the decrypted data object; and store the decrypted data object in the first page in the computer readable memory.

17. The computer readable medium of claim 16, comprising instructions to:

determine, from the first cryptographic pointer, a first address range in the computer readable memory accessible to the first cryptographic pointer; and store, in a computer-readable memory, the first address range.

18. The computer readable medium of claim 17, comprising instructions to:

receive a second memory access request for the computer readable memory, the second memory access request comprising a second cryptographic pointer to the encrypted data object; and in response to the second memory access, return the decrypted data object.

19. The computer readable medium of claim 16, comprising instructions to:

decrypt at least a portion of the cryptographic pointer to generate a plaintext pointer to the decrypted data object.

20. The computer readable medium of claim 15, comprising instructions to:

decrypt all data in the first page in the computer readable memory.

21. The computer readable medium of claim 20, comprising instructions to:
    prevent memory access requests to the first page in the computer readable memory while the data in the first page of the computer readable memory is being decrypted.

\* \* \* \* \*